(12) United States Patent
Matsumoto et al.

(10) Patent No.: US 8,911,863 B2
(45) Date of Patent: Dec. 16, 2014

(54) ARAMID CORE WIRE, METHOD FOR PRODUCING THE SAME, TRANSMISSION BELT, METHOD FOR PRODUCING THE SAME, AND TREATING AGENT FOR ARAMID CORE WIRE

(71) Applicant: Mitsuboshi Belting Ltd., Kobe-shi, Hyogo (JP)

(72) Inventors: Hideyuki Matsumoto, Hyogo (JP); Toshihiro Nishimura, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 0 days.

(21) Appl. No.: 13/768,403

(22) Filed: Feb. 15, 2013

(65) Prior Publication Data

US 2013/0217528 A1     Aug. 22, 2013

(30) Foreign Application Priority Data

Feb. 22, 2012   (JP) ................................. 2012-036225

(51) Int. Cl.
| | | |
|---|---|---|
| *D02G 3/36* | (2006.01) | |
| *D02G 3/40* | (2006.01) | |
| *C09D 123/16* | (2006.01) | |
| *F16G 1/08* | (2006.01) | |
| *F16G 1/10* | (2006.01) | |
| *C09D 165/00* | (2006.01) | |
| *D02G 3/44* | (2006.01) | |
| *C09D 163/00* | (2006.01) | |
| *D06M 15/55* | (2006.01) | |
| *F16G 5/08* | (2006.01) | |
| *D06M 15/00* | (2006.01) | |
| *D06M 15/693* | (2006.01) | |
| *D06M 15/41* | (2006.01) | |
| *D06M 101/36* | (2006.01) | |

(52) U.S. Cl.
CPC ............. *F16G 1/08* (2013.01); *D06M 2101/36* (2013.01); *C09D 123/16* (2013.01); *F16G 1/10* (2013.01); *C09D 165/00* (2013.01); *D02G 3/44* (2013.01); *C09D 163/00* (2013.01); *D06M 15/55* (2013.01); *F16G 5/08* (2013.01); *D06M 15/00* (2013.01); *D06M 15/693* (2013.01); *D06M 15/41* (2013.01)
USPC ............. 428/395; 428/375; 428/396; 442/64; 442/71; 442/104; 442/164; 442/168; 442/169

(58) Field of Classification Search
USPC ...................... 442/64, 71, 104, 164, 168, 169; 428/375, 395, 396
See application file for complete search history.

(56) References Cited

U.S. PATENT DOCUMENTS

| | | | | | |
|---|---|---|---|---|---|
| 2,902,398 | A | * | 9/1959 | Schroeder ...................... | 156/315 |
| 3,661,623 | A | * | 5/1972 | Bhakuni et al. ............... | 428/395 |
| 5,609,243 | A | * | 3/1997 | Fujita et al. ................... | 198/847 |

FOREIGN PATENT DOCUMENTS

| | | | |
|---|---|---|---|
| JP | S61-052185 | B2 | 11/1986 |
| JP | H01-207480 | A | 8/1989 |

(Continued)

*Primary Examiner* — Andrew Piziali
(74) *Attorney, Agent, or Firm* — Wood, Phillips, Katz, Clark & Mortimer

(57) ABSTRACT

The present invention relates to a method for producing an aramid core wire, containing a step of covering or impregnating an original yarn of an aramid core with a first treating agent containing a condensate of resorcin and formaldehyde, a latex and a water-soluble epoxy compound; an aramid core wire produced by the method; a transmission belt containing the aramid core wire; a method for producing the transmission belt; and a treating agent.

12 Claims, 3 Drawing Sheets

(56) References Cited

FOREIGN PATENT DOCUMENTS

| | | |
|---|---|---|
| JP | H06-057568 A | 3/1994 |
| JP | H08-100370 A | 4/1996 |
| JP | H10-025667 A | 1/1998 |
| JP | 2001-322184 A | 11/2001 |
| JP | 2002-316366 A | 10/2002 |
| JP | 2003-027376 A | 1/2003 |
| JP | 2006-045703 A | 2/2006 |
| JP | 2006-213786 A | 8/2006 |
| JP | 2009-074210 A | 4/2009 |

\* cited by examiner

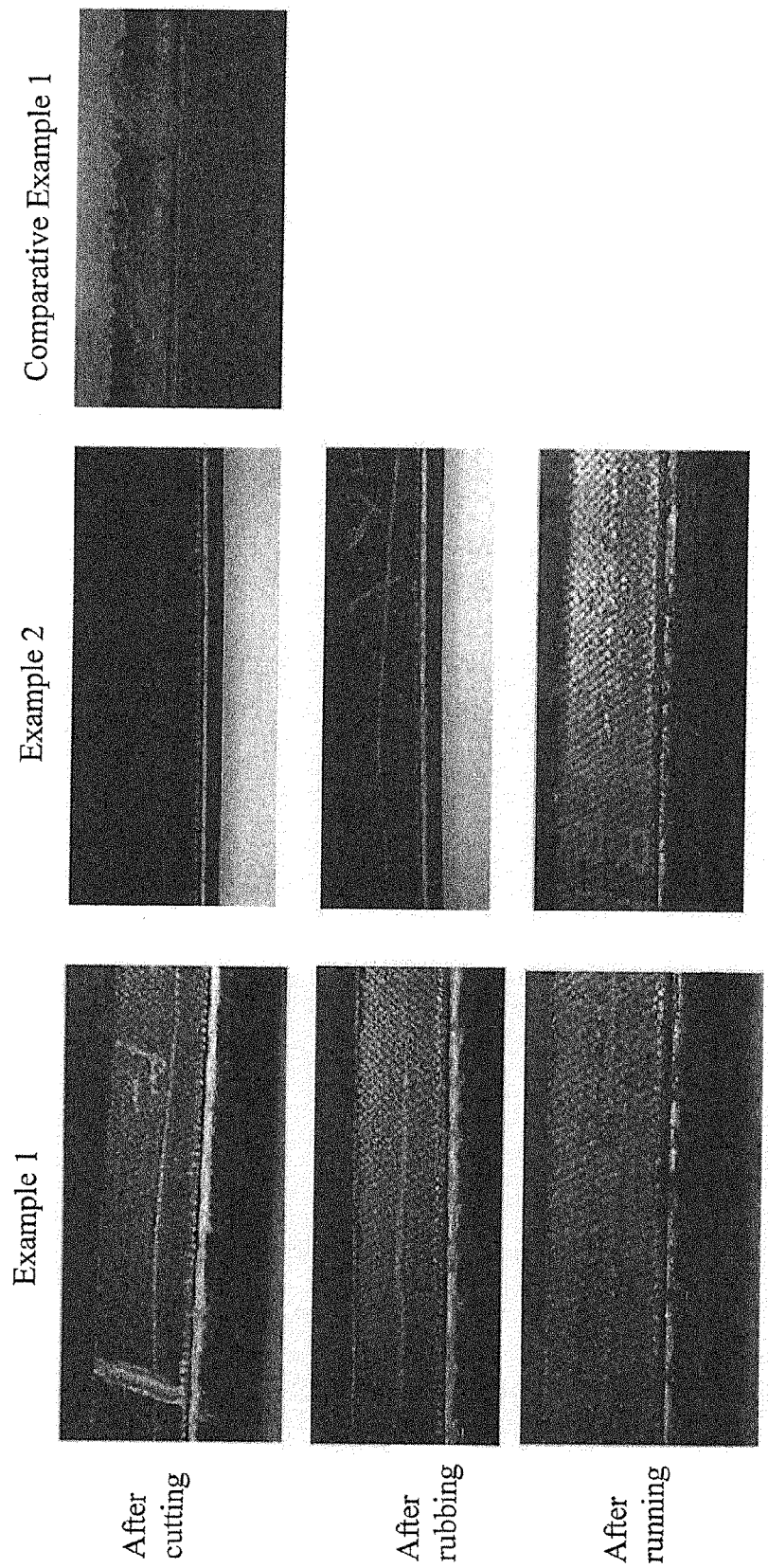

ARAMID CORE WIRE, METHOD FOR PRODUCING THE SAME, TRANSMISSION BELT, METHOD FOR PRODUCING THE SAME, AND TREATING AGENT FOR ARAMID CORE WIRE

TECHNICAL FIELD

The present invention relates to an aramid core wire used in a transmission belt which can prevent a single yarn from fraying on a side surface of the transmission belt and can save bending fatigue of the transmission belt, a method for producing the aramid core wire, a transmission belt using the aramid core wire, a method for producing the transmission belt, and a treating agent for treating an aramid core wire.

BACKGROUND ART

A transmission belt is generally produced by: winding, on an outer periphery of a cylindrical mold, at least a first unvulcanized rubber sheet, a core wire and a second unvulcanized rubber sheet in this order, to thereby form a laminate; vulcanizing the laminate to form a vulcanized belt sleeve; and cutting the vulcanized belt sleeve into round slices in a circumferential direction. A glass core wire, a polyester core wire and the like are used widely as the core wire, but those core wires cannot satisfy both of high strength and elasticity. For this reason, use of an aramid core wire is desired. However, even though the aramid core wire is used, elasticity is not sufficient as compared with the polyester core wire, and a single yarn may project on a cut surface (side surface of a transmission belt) of a vulcanized belt sleeve and fray is easy to occur. When the transmission belt has ran in the state that fray occurred, the core wire pops out (is pulled out) and is tangled in a pulley, and the transmission belt is broken. As a result, durability of the transmission belt is remarkably deteriorated. For this reason, fray of a single yarn on a cut surface of the transmission belt must physically removed by polishing or the like, and such a work greatly decreases productivity. Furthermore, in the case of the aramid core, even though a single yarn does not project on a cut surface of the transmission belt before running, when the transmission belt runs, the single yarn becomes to project and fray is easy to occur. To reduce those disadvantages, a method for preventing fray of a single yarn by treating an aramid core wire with a specific treating agent is proposed.

For example, Patent Document 1 proposes a method comprising winding a cord for a belt such as an aramid fiber cord on an outer periphery of a permeation tube having many discharging holes provided on the outer periphery thereof, and discharging a resorcin-formaldehyde-rubber latex (RFL) liquid through the discharging holes from the inside of the permeation tube in the state of dipping the cord for a belt wound around the permeation tube in the RFL liquid, thereby permeating the RFL liquid in the cord for a belt. However, in this method, bundling property of aramid fibers is not yet sufficient, and fray of a single yarn cannot effectively be prevented.

Patent Document 2 describes a method comprising: imparting a treating agent comprising an epoxy compound and a rubber latex, which are mixed in specific proportions, to a substantially non-twisted aromatic polyamide fiber; heat-treating the fiber under specific conditions; twisting the fiber in a specific twist coefficient; and applying an adhesive to the fiber. Patent Document 3 describes a method comprising: impregnating non-twisted or soft-twisted filaments constituted of organic fibers such as aramid fibers in which molecular chains are oriented in a fiber longitudinal direction, with a pretreatment agent comprising an epoxy resin or an isocyanate resin as a main component, optionally followed by heat treatment, to form a cord raw material; impregnating the cord raw material with an RFL liquid, optionally followed by heat treatment; and arranging and twisting one or more treated cord raw materials. Patent Document 4 describes a method comprising: previously dipping aramid fibers in a treating liquid containing a polyepoxide compound having two or more epoxy groups in a substantially non-twisted state; heat-treating the aramid fibers under specific conditions; twisting the aramid fibers in a specific twist constant to form an aramid fiber cord; impregnating the aramid fiber cord with a treating liquid containing RFL under vacuum and pressurized conditions; heat-treating the aramid fiber cord; and further treating the aramid fiber cord with the treating agent containing RFL. However, in those methods, the aramid fiber cord becomes too hard, resulting in decrease in bending fatigue resistance of a transmission belt.

Patent Document 5 proposes a method comprising: treating a core wire for a transmission belt, comprising twisted yarn cords with a pretreatment liquid containing a nitrile rubber-modified epoxy resin and an alkyl phenol-formaldehyde resin; subsequently treating the core wire with an RFL liquid comprising a nitrile rubber latex or a hydrogenated nitrile rubber latex; and overcoat-treating the core wire with a rubber cement prepared by dissolving a nitrile rubber blend or a hydrogenated nitrile rubber blend in a solvent. Patent Document 6 describes a method comprising: dipping an aramid fiber cord in a first treating liquid containing an aqueous mixed liquid of an initial RF condensate and rubber latex and an aqueous dispersion of a substantially water-insoluble epoxy resin that is a solid at normal temperature and has an epoxy equivalent of 300 or less; drying the aramid fiber cord having the first treating liquid adhered thereto at specific temperature; heat set-treating the aramid cord at specific temperature; dipping the heat set-treated aramid fiber cord in a second treating liquid containing an initial RF condensate and a rubber latex containing a specific proportion of an acrylonitrile-butadiene rubber; drying the aramid fiber cord having the second treating agent adhered thereto at specific temperature; and subjecting the aramid fiber cord to a normalization treatment at specific temperature, in order to improve adhesiveness between a aramid fiber cord and a rubber composition in rubber products such as a pneumatic tire and a hose. However, those methods use a water-insoluble epoxy resin, and the aramid fiber cord cannot be impregnated with the epoxy resin up to the inside thereof. As a result, fibers cannot sufficiently be bundled, and a single yarn of the aramid fiber cord cannot effectively be prevented from fraying.

Thus, trial and error are being made to satisfy both of fray resistance and bending fatigue resistance of an aramid core wire over about 20 years from the start to use the aramid core wire, but an aramid core wire satisfying both characteristics is not yet obtained.

Patent Document 1: JP-A-2009-74210
Patent Document 2: JP-A-1-207480
Patent Document 3: JP-A-6-57568
Patent Document 4: JP-A-8-100370
Patent Document 5: JP-A-2001-322184
Patent Document 6: JP-A-2006-45703

SUMMARY OF THE INVENTION

Accordingly, one object of the present invention is to provide an aramid core wire that can satisfy both of fray resistance on a side surface of a transmission belt and bending fatigue resistance of a transmission belt, a method for producing the aramid core wire, a transmission belt using the aramid core wire, and a method for producing the transmission belt.

Another object of the present invention is to provide an aramid core wire that, even though the aramid core wire is a twisted yarn, can satisfy both of fray resistance and bending fatigue resistance, a method for producing the aramid core wire, a transmission belt using the aramid core wire, and a method for producing the transmission belt.

Still another object of the present invention is to provide an aramid core wire that can improve adhesiveness between the aramid core wire and a rubber layer of a transmission belt, a method for producing the aramid core wire, a transmission belt using the aramid core wire, and a method for producing the transmission belt.

As a result of intensive investigations to achieve the objects, the present inventors have found the following facts. When an original yarn of an aramid core wire is treated with a treating agent comprising a condensate (RF condensate) of resorcin (R) and formaldehyde (F), a latex and a water-soluble epoxy compound, the treating agent can uniformly and efficiently penetrate between filaments of the original yarn, thereby impregnating the original yarn with the treating agent, and it may be because residual amino groups and/or carboxyl groups of an aramid fiber and hydroxyl groups of the RF condensate uniformly react with epoxy groups of the water-soluble epoxy compound, bundling property of the filaments can be improved, and additionally, appropriate flexibility can be imparted by the latex. As a result, both of fray resistance on a side surface of a transmission belt and bending fatigue resistance of the transmission belt can be satisfied. The present invention has been completed based on the findings.

The method of the present invention is a method for producing an aramid core wire used in a transmission belt, which comprises a step of treating (covering or impregnating) an original yarn (for example, a twisted yarn) of an aramid core with a first treating agent containing a condensate of resorcin and formaldehyde, a rubber (or a latex) and a water-soluble epoxy compound (or a water-soluble epoxy resin).

The water-soluble epoxy compound is preferably at least one selected from the group consisting of alkane polyol polyglycidyl ethers and polyalkane polyol polyglycidyl ethers. The water-soluble epoxy compound preferably has an epoxy equivalent of 200 g/eq or less. The water-soluble epoxy compound preferably has a dissolution rate to water at 25° C. of 90% or more.

The first treating agent preferably has a total solid concentration of from 5 wt % to 35 wt %. A solid concentration of the epoxy compound calculated by dividing the weight of a solid content of the water-soluble epoxy compound by the total weight of the weight of a solid content of the condensate of resorcin and formaldehyde, the weight of a solid content of the latex and the weight of a solid content of the water-soluble epoxy compound is preferably from 5 wt % to 25 wt %. However, it may be because resorcin and formaldehyde have high reactivity, the amount of the condensate of resorcin and formaldehyde can be considered as the total amount of resorcin and formaldehyde as raw materials. Further, Resorcin and formaldehyde bring about dehydration condensation. In the present specification, the amount of the condensate of resorcin and formaldehyde is defined as the total amount of resorcin and formaldehyde before dehydration condensation, that is, the total amount of unreacted resorcin and formaldehyde.

The production method according to the present invention may further comprise a step of covering or impregnating the original yarn of an aramid core wire covered or impregnated with the first treating agent containing a condensate of resorcin and formaldehyde, a latex and a water-soluble epoxy compound, with a second treating agent containing a condensate of resorcin and formaldehyde and a latex, and may further comprise a step of covering or impregnating the original yarn of an aramid core wire covered or impregnated with the first treating agent, and if necessary, the second treating agent, with a third treating agent containing an olefin rubber (or an olefin elastomer). The second treating agent may not contain an epoxy compound (a water-soluble epoxy compound and a non-water-soluble epoxy compound).

The present invention provides an aramid core wire obtained by the above method. Further, the present invention provides a transmission belt comprising an adhesive rubber layer having the aramid core wire embedded therein in a longitudinal direction of the belt, and a compression rubber layer formed on one surface of the adhesive rubber layer. The adhesive rubber layer and the compression rubber layer each preferably contain an olefin rubber.

The present invention provides a method for producing a transmission belt, comprising vulcanizing a cylindrical laminate having the aramid core wire sandwiched between a pair of unvulcanized rubber sheets to form a vulcanized belt sleeve, and cutting the cylindrical vulcanized belt sleeve in a circumferential direction.

Further, the present invention further provides a treating agent for treating an aramid core wire used in a transmission belt (for example, a treating agent for improving fray resistance and bending fatigue resistance of an aramid core wire), which comprises a condensate of resorcin and formaldehyde, a latex and a water-soluble epoxy compound.

In the present invention, the aramid core wire treated with a treating agent containing a condensate of resorcin and formaldehyde, a latex and a water-soluble epoxy compound is used in a transmission belt. As a result, scuffing and fray of the aramid core wire on a side surface of the transmission belt can be prevented, and bending fatigue resistance of the transmission belt can remarkably be improved. Particularly, even though the aramid core wire is a twisted yarn, the treating agent can uniformly and efficiently penetrate narrow spaces among filaments, and as a result, both of fray resistance and bending fatigue resistance can be achieved. The present invention can further improve adhesiveness between a rubber layer and the aramid core wire in the transmission belt.

BRIEF DESCRIPTION OF THE DRAWINGS

FIG. 5 is photographs showing fray of aramid core wires on a side surface of the transmission belts of Example 1, Example 2 and Comparative Example 1.

DESCRIPTION OF REFERENCE NUMERALS AND SIGNS

Figure 1:
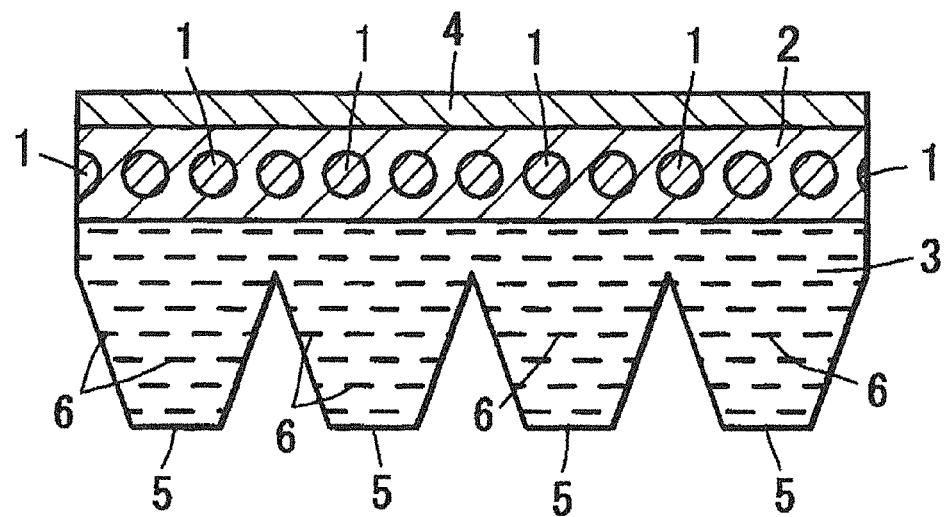
FIG. 1 is a schematic cross-sectional view showing one example of the transmission belt of the present invention.

1: Aramid core wire
2: Adhesive rubber layer

3: Compression rubber layer
4: Extensible rubber layer
5: Rib
6: Amide short fiber
11: Test specimen
12a, 12b: Rotational bar
13: Frame
14: Load
21: V-ribbed belt
22: Drive pulley
23: Tension pulley
24: Idler pulley

DETAILED DESCRIPTION OF THE INVENTION

Method for Producing Aramid Core Wire for Transmission Belt

The method for producing an aramid core wire for a transmission belt of the present invention comprises at least a step of treating (covering or impregnating) an original yarn (an aramid core wire main body) of an aramid core wire with a specific treating agent.

The original yarn of the aramid core wire is not particularly limited so long as it has strength capable of withstanding the running of a transmission belt. Example of the original yarn includes a multifilament yarn (an aramid multifilament yarn) containing a monofilament yarn of an aramid fiber (an aromatic polyamide fiber).

Examples of the aramid fiber include para-aramid fibers and meta-aramid fibers. Examples of the para-aramid fibers include poly-p-phenylene terephthalamide fibers (for example, TWARON manufactured by Teijin Limited, and KEVLAR manufactured by Du Pont-Toray Co., Ltd.) and copolymer fibers of poly-p-phenylene terephthalamide and 3,4'-oxydiphenylene terephtalamide (for example, TECHNORA manufactured by Teijin Limited). Examples of the meta-aramid fibers include poly-m-phenylene isophthalamide fibers (for example, CONEX manufactured by Teijin Limited). Those aramid fibers can be used alone or as mixtures of two or more thereof. Of those aramid fibers, para-aramid fibers are preferred from the standpoint of having high modulus.

The aramid multifilament yarn contains a monofilament yarn of the aramid fiber, and if necessary, may contain a monofilament yarn of other fibers (such as a polyester fiber). In the present invention, an original yarn is treated with a specific treating agent. Therefore, even though the original yarn is a multifilament yarn of the aramid fiber (a multifilament yarn consisting of a monofilament yarn of the aramid fiber), fray on a side surface of a transmission belt can be prevented, and additionally, bending fatigue resistance of the transmission belt can be improved.

The aramid multifilament yarn contains a plurality of monofilament yarns, and from the standpoint of durability of a transmission belt, preferably contains 100 to 5,000 monofilament yarns, more preferably 500 to 4,000 monofilament yarns, and further preferably 1,000 to 3,000 monofilament yarns.

The monofilament yarn may have an average fineness of, for example from 1 dtex to 10 dtex, preferably from 1.2 dtex to 8 dtex, and more preferably from 1.5 dtex to 5 dtex.

The aramid multifilament yarn may be used without bundling monofilament yarns to each other (for example, non-twisting), and may be used by bundling a plurality of monofilament yarns by bundling means (for example, twisting, entangling or bundling). In the present invention, even though the aramid multifilament yarns are bundled (particularly, even though the aramid multifilament yarn is a twisted yarn), because the multifilament yarns are treated with a specific treating agent, the treating agent can efficiently penetrate spaces among the monofilament yarns, and both of fray resistance and bending fatigue resistance of the aramid core wire can be achieved. Thus, in the present invention, original yarns of the aramid core wire can previously be bundled (such as twisted). Therefore, even in the case of treating the original yarns of the aramid core wire with a plurality of treating agents, these treatments can continuously be conducted, leading to excellent productivity.

The twisted yarn (or cord) may be a single twisted yarn (strand) in which a plurality of monofilament yarns is used as a single yarn, and at least one single yarn is right-twisted (S-twist) or left-twisted (Z-twist). From the standpoint of strength, the single yarn may contain, for example, 10 to 2,000 monofilaments, preferably 100 to 1,800 monofilaments, and more preferably 500 to 1,500 monofilaments. The single yarn may have an average fineness of, for example, 500 dtex to 3,000 dtex, preferably 1,000 dtex to 2,500 dtex, and more preferably 1,500 dtex to 2,000 dtex.

In many cases, the single twisted yarn (strand) generally contains 1 to 6 single yarns, preferably 1 to 4 single yarns, and more preferably 1 to 3 (for example, 1 to 2) single yarns. In the case that the single twisted yarn (strand) contains a plurality of single yarns, the plurality of single yarns are bundled (arranged) and twisted in many cases.

The single twisted yarn (strand) may be, for example, a soft twist yarn or a moderate twist yarn (particularly, a soft twist yarn). The number of twist of the single twisted yarn (strand) may be, for example, from 20 times/m to 50 times/m, preferably from 25 times/m to 45 times/m, and more preferably from 30 times/m to 40 times/m. The single twisted yarn (strand) may have a twist factor (T F) represented by the following formula (I) of, for example, 0.1 to 1, and preferably 0.1 to 0.8.

$$\text{Twist factor}(TF) = (\text{number of twist}(\text{times/m}) \times \sqrt{\text{total fineness}(\text{tex})})/960 \qquad (1)$$

From the standpoint of the improvement of strength, the twisted yarn may be a yarn in which a plurality of single twisted yarns (strands) as a first twist yarn are subjected to second twist (for example, an organize (plied yarn), Koma twist yarn or Lang lay yarn), and may be a twisted yarn in which a single twisted yarn (strand) and a single yarn as first twist yarns are subjected to second twist (for example, a corkscrew yarn). The number of the first twist yarn constituting those twisted yarns may be, for example, from 2 to 5, preferably from 2 to 4, and more preferably 2 to 3. The single twist direction (first twist direction) and the second twist direction may be the same direction or the opposite direction. From the standpoint of bending fatigue resistance, the same direction (Lang lay) is preferred.

The number of the second twist is not particularly limited, and may be, for example, from 50 times/m to 200 times/m, preferably from 80 times/m to 180 times/m, and more preferably from 100 times/m to 150 times/m. In the second twist, the twist factor (T F) represented by the formula (I) may be, for example, from 0.5 to 6.5, preferably from 0.8 to 5, and more preferably from 1 to 4.

The original yarn of the aramid core wire may have an average diameter of, for example, from 0.2 mm to 2.5 mm, preferably from 0.4 mm to 2 mm, and more preferably from 0.5 mm to 1.5 mm.

Treating agents (an unvulcanized rubber composition or an RFL liquid) can give fray resistance and bending fatigue resistance to the aramid core wire. In the method for producing an aramid core wire of the present invention, the original yarn of an aramid core wire is treated (covered or impregnated) with a first treating agent, and optionally, second treating agent and third treating agent. The first treating agent contains at least a condensate of resorcin (R) and formaldehyde (F) (an RF condensate), a rubber or a latex, and a water-soluble epoxy compound (or a water-soluble epoxy resin).

The RF condensate is not particularly limited so long as it can improve bundling property of the aramid fiber together with the water-soluble epoxy compound, and examples thereof include a novolac type, a resol type and a combination thereof. The RF condensate is preferably a resol type from the standpoints of a high methylol group concentration and excellent reactivity with an epoxy compound.

The RF condensate may be a reaction product (for example, an initial condensate or a prepolymer) obtained by reacting resorcin and formaldehyde in the presence of, for example, water and a basic catalyst (alkali metal salts such as sodium hydroxide; alkaline earth metal salts; ammonia; or the like). Aromatic monools such as phenol or cresol may be used together with resorcin so long as it does not impair the advantage of the present invention. Furthermore, aromatic di- or polyols such as catechol or hydroquinone may be used together with resorcin. As formaldehyde, condensates of formaldehyde (such as trioxane or p-formaldehyde) may be used, and an aqueous solution of formaldehyde (such as formalin) may be used.

The ratio (use ratio) between resorcin and formaldehyde may be, for example, resorcin/formaldehyde (molar ratio)=1/0.5 to 1/3, preferably 1/0.7 to 1/2.5, and more preferably 1/0.8 to 1/2.2. When formaldehydes are used in excess amount to resorcin, a resol type can efficiently be obtained.

A rubber constituting the latex is not particularly limited so long as it can give flexibility to the aramid core wire, and examples thereof include diene rubbers such as natural rubber, isoprene rubber, butadiene rubber, chloroprene rubber, styrene-butadiene rubber, acrylonitrile-butadiene rubber (nitrile rubber), or hydrogenated products of those diene rubbers, olefin rubbers such as ethylene-α-olefin rubber (ethylene-α-olefin elastomer), polyoctenylene rubber, ethylene-vinyl acetate copolymer rubber, chlorosulfonated polyethylene rubber, or alkylated chlorosulfonated polyethylene rubber, acryl rubbers, silicone rubbers, urethane rubbers, epichlorohydrin rubbers, fluorine-containing rubbers, and combinations of those.

The rubber constituting the latex can appropriately be selected according to the kind of rubber contained in a third treating agent described below, the kind of rubber of a rubber layer (adhesive rubber layer) in which a core wire is embedded in a transmission belt, and the like. For example, in the case where the rubber of the third treating agent or the rubber of the rubber layer of a transmission belt contains an olefin rubber (for example, ethylene-α-olefin rubber), the rubber constituting the latex is preferably nitrile rubber, butadiene rubber or chlorosulfonated polyethylene rubber.

The proportion of the latex can be selected from a range of, for example, from 40 parts by weight to 700 parts by weight in terms of a solid content per 100 parts by weight of the RF condensate. The proportion may be, for example, from 45 parts by weight to 600 parts by weight, preferably from 50 parts by weight to 500 parts by weight, and more preferably from 55 parts by weight to 400 parts by weight, per 100 parts by weight of the RF condensate.

In the present invention, the epoxy compound is a water-soluble epoxy compound. Therefore, the original yarn of the aramid core wire can uniformly and efficiently be impregnated with the epoxy compound up to the inside thereof (spaces among filaments). Further, it may be because the epoxy compound reacts with residual amino group and/or carboxyl group of the aramid fibers and hydroxyl group of the RF condensate, bundling property of the aramid fiber is remarkably improved, thereby fray of the aramid fiber can effectively be prevented. On the other hand, in the case where the epoxy compound is water-insoluble particles, the original yarn of the aramid core wire cannot be impregnated with the epoxy compound up to the inside thereof. Additionally, it may be because the particles become brittle nuclei, resulting in formation of a heterogeneous structure, fibers are easy to be in an unbound state by tearing at cutting into a belt, and fray cannot be prevented on the cut surface of the belt.

The epoxy compound generally has 2 or more (for example, from 2 to 6, preferably from 2 to 4, and more preferably 2 or 3) epoxy groups.

The epoxy compound having 2 or more epoxy groups is not particularly limited so long as it is water-soluble. Linear aliphatic polyol polyglycidyl ethers (for example, alkane polyol polyglycidyl ethers and polyalkane polyol polyglycidyl ethers) are widely used from the standpoint of achieving both of bundling property and flexibility of an aramid yarn.

Examples of the alkane polyol polyglycidyl ethers include alkane di- to hexaol polyglycidyl ethers, for example, $C_{2-4}$ alkylene glycol diglycidyl ethers such as ethylene glycol diglycidyl ether or propylene glycol diglycidyl ether; and $C_{3-10}$ alkane tri- to hexaol polyglycidyl ethers such as glycerin polyglycidyl ether, pentaerythritol polyglycidyl ether and sorbitol polyglycidyl ether.

Examples of the polyalkane polyol polyglycidyl ether include polyalkane di- to tetraol polyglycidyl ethers, for example, poly $C_{2-4}$ alkylene glycol diglycidyl ethers such as polyethylene glycol diglycidyl ether and polypropylene glycol diglycidyl ether; and $C_{6-12}$ polyalkane tri- to tetraol polyglycidyl ethers such as diglycerin polyglycidyl ether and dipentaerythritol polyglycidyl ether. In the polyalkane polyol polyglycidyl ether, the number of an oxyalkylene group (average addition mole number) is not particularly limited, and may be, for example, from 2 to 15, preferably 2 to 12, and more preferably from 2 to 10.

The epoxy compound can be used alone or as mixtures of two or more thereof. Of the epoxy compounds, alkane tri- to hexaol polyglycidyl ethers, poly $C_{2-4}$ alkylene glycol diglycidyl ethers and $C_{6-8}$ polyalkane tri- to tetraol polyglycidyl ethers are preferably used.

In the epoxy compound, the ratio between the number of carbon atom and the number of oxygen atom may be, for example, the number of carbon atom/the number of oxygen atom=from 1/2 to 3/1, preferably from 1/2 to 2.5/1, and more preferably from 1/1.5 to 2/1 (for example, from 1/1 to 2/1). Water solubility of the epoxy compound becomes high with increasing the ratio of oxygen atom, and content (impregnation content) or adhesion ratio of the epoxy compound to the original yarn of the aramid core wire can be improved. As a result, both of fray resistance and bending fatigue resistance of the aramid core wire can be achieved.

The epoxy compound may have an epoxy equivalent (molecular weight per one epoxy group) of, for example, 300 g/eq or less (for example, from 100 g/eq to 280 g/eq), preferably 250 g/eq or less (for example, from 110 g/eq to 220 g/eq), and more preferably 200 g/eq or less (for example, from 120 g/eq to 200 g/eq). When the epoxy equivalent is too large, reactivity to the RF condensate is decreased, and distance between reaction sites becomes long. As a result, a coating film formed by the first treating agent becomes soft, and sufficient hardness required at cutting a vulcanized belt sleeve is lost. As a result, aramid yarns becomes easy to fray and adhesive force to the rubber layer of a transmission belt is decreased.

The epoxy compound may have a dissolution rate to water (water solubility) at 25° C. selected from a range of, for example, 50% or more. The dissolution rate may be 80% or more, preferably 85% or more, and more preferably 90% or more (for example, from 90% to 100%, and particularly from 95% to 100%). The dissolution rate to water (water solubility) is a value that a dissolution amount (g) when 10 g of an epoxy compound was added to 90 g of water, followed by stirring is indicated by percentage. When the dissolution rate to water (water solubility) of the epoxy compound is too small, a large amount of precipitates insoluble in the first treating agent is formed, and the epoxy compound cannot sufficiently penetrate spaces among filaments. As a result, fray of the aramid core wire cannot be inhibited, and adhesive force to the rubber layer of a transmission belt is not sufficient.

The water-soluble epoxy compound may be contained in the first treating agent in an amount of, for example, from 0.1 parts by weight to 200 parts by weight, preferably from 1 parts by weight to 190 parts by weight, and more preferably from 5 parts by weight to 180 parts by weight, per 100 parts by weight of the RF condensate.

The first treating agent may have an epoxy compound solid content concentration of, for example, from 0.1 wt % to 50 wt %, preferably from 0.5 wt % to 40 wt %, and more preferably from 1 wt % to 30 wt % (for example, from 5 wt % to 25 wt %). The epoxy compound solid content is obtained by dividing the weight of a solid content of the water-soluble epoxy compound by the total weight of the weight of a solid content of the RF concentrate, the weight of a solid content of the latex and the weight of a solid content of the water-soluble epoxy compound (or the weight of the total solid content of the first treating agent).

When the proportion of the water-soluble epoxy compound is too small, bundling property of filaments of the aramid fiber becomes not sufficient. As a result, the aramid core wire becomes easy to fray, and adhesive property to the rubber layer of a transmission belt may be decreased. On the other hand, when the proportion of the water-soluble epoxy compound is too large, stability of the first treating agent is deteriorated, a reaction between the RF condensate and the water-soluble epoxy compound proceeds in the first treating agent, and the amount of insoluble precipitates is increased. As a result, it may become difficult to apply the first treating agent to the original yarn of the aramid core wire.

The first treating agent generally contains water. Furthermore, if necessary, the first treating agent may contain the conventional additives (for example, a vulcanizing agent, a vulcanization accelerator, a covulcanizer, a filler, an anti-aging agent and a lubricant).

The first treating agent may have a total solid content concentration of, for example, from 5 wt % to 35 wt %, preferably from 10 wt % to 30 wt %, and more preferably from 12 wt % to 28 wt % (for example, from 15 wt % to 25 wt %). The total solid content concentration is obtained by dividing the total weight of the weight of a solid content of the water-soluble epoxy compound, the weight of a solid content of the RF condensate and the weight of a solid content of the latex by the weight of the treating agent. When the total solid content concentration of the first treating agent is too small, the bundling property of filament yarns of the aramid fiber is decreased, and the aramid core wire becomes easy to fray. On the other hand, when the total solid content concentration of the treating agent is too large, the first treating agent cannot sufficiently penetrate between the aramid fibers, and the aramid core wire becomes too hard. As a result, bending fatigue resistance is decreased.

When the dissolution rate to water (water solubility) of the epoxy compound, the proportion of the water-soluble epoxy compound to the RF condensate (or the total of the RF condensate, the latex and the water-soluble epoxy compound), and the total solid content concentration of the first treating agent are adjusted as described above, stability of the first treating agent becomes excellent, and pot life is prolonged.

A method for treating the original yarn of the aramid fiber with the first treating agent is not particularly limited, and examples thereof include spraying, coating and dipping. Of those treatment methods, dipping is generally used. The dipping time may be, for example, from 1 second to 10 seconds, and preferably from 2 seconds to 5 seconds.

The original yarn of the aramid fiber may be dried, if necessary, after treated with the first treating agent. The drying temperature may be, for example, from 70° C. to 150° C., preferably from 80° C. to 140° C., and more preferably from 90° C. to 130° C. The drying time may be, for example, from 10 seconds to 30 minutes, preferably from 30 seconds to 10 minutes, and more preferably from 1 minute to 5 minutes. The drying may be conducted by applying some degree of tension to the original yarn of the aramid core wire. The tension may be, for example, from 5 N to 15 N, and preferably from 10 N to 15 N. When the original yarn of the aramid core wire is dried under tension, the first treating agent becomes easy to fit in the original yarn of the aramid core wire. When the original yarn of the aramid core wire is a twisted yarn, uneven twisting can be reduced, and variation of a diameter of a twisted yarn due to the uneven twisting can be decreased.

In the resultant obtained by treating the original yarn of the aramid core wire with the first treating agent and, if necessary, followed by drying, the proportion (content or adhesion ratio) of the first treating agent may be, for example, from 1 parts by weight to 20 parts by weight, and preferably from 5 parts by weight to 15 parts by weight, in terms of a solid content, per 100 parts by weight of the total of the first treating agent and the original yarn of the aramid core wire.

The method for producing an aramid core wire for a transmission belt of the present invention may further comprise a step of treating the original yarn of the aramid core wire treated with the above-described first treating agent with a second treating agent (unvulcanized rubber composition or RFL liquid) containing a RF condensate and a rubber or a latex.

Examples of the RF condensate and the latex, to be contained in the second treating agent include the same components as the RF condensate and the latex in the first treating agent, and the preferred components are the same. The RF condensate and the latex in the second treating agent may be the same kind of the RF condensate and the latex in the first treating agent, and may be different kind. The proportion of the RF condensate and the latex in the second treating agent can be selected from the same range as the proportion in the first treating agent.

The second treating agent may contain an epoxy compound (or epoxy resin) in addition to the RF condensate and the latex. Examples of the epoxy compound include the same components as the epoxy compound exemplified in the first treating agent. The epoxy compound in the second treating agent may have an epoxy equivalent selected from the same range as the epoxy equivalent of the epoxy compound in the first treating agent, and also may be selected from a range exceeding 300 g/eq (for example, from 350 g/eq to 1,000 g/eq). The epoxy compound in the second treating agent may have a dissolution rate to water (water solubility) selected from the same range of the dissolution rate to water (water solubility) of the epoxy compound in the first treating agent, and also may be selected from a range less than 50% (for example, from 0% to 40%).

The second treating agent has the same solid content concentration of the water-soluble epoxy compound as that in the first treating agent, or has a smaller concentration than that in the first treating agent. For example, the solid content concentration may be 30 wt % or less, and preferably 25 wt % or less (for example, 10 wt % or less). When the concentration is too high, bending fatigue resistance and adhesive property to the rubber layer of a transmission belt are decreased. For this reason, the second treating agent may not contain an epoxy compound (a water-soluble epoxy compound and a water-insoluble epoxy compound).

The second treating agent generally contains water. If necessary, the second treating agent may contain conventional additives (for example, a vulcanizing agent, a vulcanization accelerator, a covulcanizer, a filler, an anti-aging agent and a lubricant).

The second treating agent has a smaller total solid content concentration than that of the first treating agent, and may be, for example, from 0.1 wt % to 20 wt %, preferably from 0.5 wt % to 15 wt % (for example, from 1 wt % to 11 wt %), and more preferably from 1.5 wt % to 10 wt % (for example, from 2 wt % to 10 wt %). When the total solid content concentration of the second treating agent is too small, the adhesion amount of a solid content to the original yarn of the aramid core wire is decreased, and characteristics of the aramid core wire cannot sufficiently be improved. On the other hand, when the total solid content concentration of the second treating agent is too large, the adhesion amount of a solid content to the original yarn of the aramid core wire is increased, the aramid core wire becomes too hard, and bending fatigue resistance is decreased.

A treatment method of the second treating agent may be the same as the treatment method of the first treating agent, and the preferred method is the same.

In the resultant obtained by treating the original yarn of the aramid core wire with the first treating agent and the second treating agent, the proportion (content or deposit ratio) of the second treating agent may be, for example, from 0.1 parts by weight to 2 parts by weight, and preferably from 0.5 parts by weight to 1 part by weight, in terms of a solid content, per 100 parts by weight of the total of the first treating agent, the second treating and the original yarn of the aramid core wire.

The ratio between the adhesion amount of the first treating agent and the adhesion amount of the second treating agent may be, for example, the adhesion amount of the first treating agent/the amount of the second treating agent=from 20/1 to 5/1, and preferably from 15/1 to 7/1 (for example, from 10/1 to 8/1).

The method for producing an aramid core wire for a transmission belt of the present invention further comprises a step of treating the original yarn of the aramid core wire treated with the first treating agent and, if necessary, the second treating agent, with a third treating agent (an unvulcanized rubber composition) containing a rubber (or a rubber cement). The treatment with the third treating agent may be conducted after the treatment with the first treating agent or may be conducted after the treatment with the second treating agent.

The rubber can appropriately be selected according to the kind of the rubber contained in the first treating agent or the second treating agent, the kind of the rubber of the rubber layer having the aramid core wire embedded therein in a transmission belt, and the like. Examples of the rubber include rubbers exemplified in the first treating agent, for example, olefin rubbers such as ethylene-α-olefin elastomer (ethylene-α-olefin rubber), chlorosulfonated polyethylene rubber, or alkylated chlorosulfonated polyethylene rubber; and diene rubbers such as chloroprene rubber, nitrile rubber or hydrogenated nitrile rubber. Those rubbers can be used alone or as mixtures of two or more thereof. Of those rubbers, olefin rubbers (for example, ethylene-α-olefin elastomer) are widely used.

Examples of the ethylene-α-olefin elastomer include ethylene-α-olefin rubber and ethylene-α-olefin-diene rubber.

Examples of the α-olefin include chain $\alpha$-$C_{3-12}$ olefins such as propylene, butene, pentene, methylpentene, hexene and octane. The α-olefin can be used alone or as mixtures of two or more thereof. Of the α-olefins, $\alpha$-$C_{3-4}$ olefins such as propylene (particularly propylene) are preferably used.

The ratio between ethylene and α-olefin may be, for example, ethylene/α-olefin (weight ratio)=from 40/60 to 90/10, preferably from 45/55 to 85/15 (for example, from 50/50 to 82/18), and more preferably from 55/45 to 80/20 (for example, 55/45 to 75/25).

The diene component is generally a non-conjugated diene monomer, and examples thereof include $C_{5-15}$ non-conjugated diene monomers such as dicyclopentadiene, methylene norbornene, ethylidene norbornene, 1,4-hexadiene and cyclooctadiene. Those diene components can be used alone or as mixtures of two or more thereof.

The proportion of the diene component in the ethylene-α-olefin-diene rubber can be selected from a range of from 4 wt % to 15 wt %. The proportion may be, for example, from 4.2 wt % to 13 wt % (for example, from 4.3 wt % to 12 wt %), and preferably from 4.4 wt % to 11.5 wt % (for example, from 4.5 wt % to 11 wt %).

Representative examples of the ethylene-α-olefin elastomer include ethylene-α-olefin rubber such as ethylene-propylene rubber (EPR), and ethylene-α-olefin-diene rubber such as ethylene-propylene-diene copolymer (EPDM).

The ethylene-α-olefin elastomer can be used alone or as mixtures of two or more thereof. Of the ethylene-α-olefin elastomer, ethylene-α-olefin-diene rubber (for example, EPDM) is preferably used. The ethylene-α-olefin-diene rubber may have an iodine value of for example, from 3 to 40, preferably from 5 to 30, and more preferably from 10 to 20. The iodine value can be measured by using an infrared spectrophotometer. The ethylene-α-olefin-diene rubber may have a Mooney viscosity measured at 100° C. in accordance with JIS K6300-1 (2001) of, for example, from 25 to 120, and preferably from 30 to 110.

If necessary, the third treating agent may contain the conventional additives such as a vulcanizing agent (or a crosslinking agent), a covulcanizer (or a co-crosslinker), a vulcanization accelerator (or a crosslinking aid), a vulcanization retarder, an adhesion improver, a filler, an anti-aging agent, a tackifier, a stabilizing agent, a coupling agent, a plasticizer, a lubricant, a colorant and a solvent. The additives can be used alone or as mixtures of two or more thereof. Of the additives, a vulcanizing agent, a covulcanizer, a vulcanization accelerator, an adhesion improver, a filler, an anti-aging agent, a lubricant, a solvent and the like are widely used.

The vulcanizing agent can be classified into a sulfur vulcanizing agent and a non-sulfur vulcanizing agent. Examples of the sulfur vulcanizing agent include sulfur (for example, powdery sulfur, precipitated sulfur, colloidal sulfur, insoluble sulfur and highly-dispersive sulfur), and a sulfur compound (for example, sulfur chloride such as sulfur monochloride or sulfur dichloride).

Examples of the non-sulfur vulcanizing agent include organic peroxides (for example, diacyl peroxide, peroxyester, dialkyl peroxide such as dicumyl peroxide, t-butylcumyl peroxide, 1,1-di-butylperoxy-3,3,5-trimethylcyclohexane, 2,5-dimethyl-2,5-di(t-butylperoxy)-hexane and 1,3-bis(t-butylperoxy-isopropyl)benzene, and di-t-butyl peroxide), oximes (for example, quinone dioxime), maleimides (for example, bismaleimide, phenylmaleimide, and N—N'-m-phenylene bismaleimide), allyl esters (for example, diallyl fumarate (DAF), diallyl phthalate (DAP), triallyl cyanurate (TAC), triallyl isocyanurate (TAIC), and trimethallyl isocyanurate (TMAIC)), and (meth)acrylates (for example, alkyl (meth) acrylate such as methyl (meth)acrylate; and di- to tetra(meth) acrylate of alkane di- to tetraol, such as ethylene glycol di(meth)acrylate).

The vulcanizing agent can be used alone or as mixtures of two or more thereof. Of the vulcanizing agents, a sulfur vulcanizing agent (for example, sulfur) is preferably used. The proportion of the vulcanizing agent may be, for example, 30 parts by weight or less, preferably from 0.01 parts by weight to 20 parts by weight, and more preferably from 0.1 parts by weight to 10 parts by weight (for example, from 0.5 parts by weight to 5 parts by weight), per 100 parts by weight of the rubber.

Examples of the covulcanizer include metal oxides such as zinc oxide, magnesium oxide, calcium oxide, barium oxide, iron oxide, copper oxide, titanium oxide and aluminum oxide. The covulcanizer can be used alone or as mixtures of two or more thereof. The proportion of the covulcanizer may be, for example, 30 parts by weight or less, preferably from 0.1 parts by weight to 20 parts by weight, and more preferably from 0.5 parts by weight to 15 parts by weight (for example, from 1 part by weight to 10 parts by weight), per 100 parts by weight of the rubber.

Examples of the vulcanization accelerator include thiuram accelerators (for example, tetramethyl thiuram.monosulfide (TMTM), tetramethyl thiuram.disulfide (TMTD), tetraethyl thiuram.disulfide (TETD), tetrabutyl thiuram.disulfide (TBTD), and dipentamethylene thiuram tetrasulfide (DPTT)), thiazole accelerators (for example, 2-mercaptobenzothiazole and its salt), sulfenamide accelerators (for example, N-cyclohexyl-2-benzothiazyl sulfenamide), urea accelerators (for example, ethylene thiourea), and combinations of those.

The proportion of the vulcanization accelerator may be, for example, 30 parts by weight or less, preferably from 0.1 parts by weight to 20 parts by weight, and more preferably from 0.5 parts by weight to 15 parts by weight (for example, from 1 parts by weight to 10 parts by weight), per 100 parts by weight of the rubber.

Examples of the adhesion improver include the RF condensate as exemplified in the first treating agent; condensates between melamines and aldehydes (for example, melamine-formaldehyde condensate, and hexa $C_{1-4}$ alkoxymethylol melamine), the epoxy resin as exemplified in the first treating agent, isocyanate resin (for example, polymethylene polyphenylene polyisocyanate), and combinations of those. As the adhesion improver, commercially available adhesives such as CHEMLOK 402 manufactured by Lord Corporation can be used.

The proportion of the adhesion improver may be, for example, 50 parts by weight or less, preferably from 0.1 parts by weight to 40 parts by weight, and more preferably from 0.5 parts by weight to 30 parts by weight (for example, from 1 part by weight to 20 parts by weight), 100 parts by weight of the rubber.

Examples of the filler (including a reinforcing agent) include organic or inorganic fillers, for example, granular fillers (for example, carbon black (for example, furnace black such as SAF, ISAF, HAF, MAF, FEF, GPF or SRF), silica (dry silica or wet silica), calcium carbonate and talc), fibrous fillers (for example, short fibers such as polyamide fiber, glass fiber or carbon fiber), and combinations of those. Of the fillers, inorganic fillers (for example, granular filler such as carbon black or silica) are used widely.

The proportion of the filler may be, for example, from 1 part by weight to 80 parts by weight, preferably from 5 parts by weight to 50 parts by weight, and more preferably from 10 parts by weight to 40 parts by weight, per 100 parts by weight of the rubber.

Examples of the anti-aging agent include amine anti-aging agents (for example, aromatic secondary amines such as N-phenyl-1-naphthylamine, octylated diphenylamine, 4,4'-bis(α,α-dimethylbenzyl)diphenylamine, N,N'-diphenyl-p-phenylene diamine, or N,N'-dinaphthyl-p-phenylene diamine, ketone-amine reaction products such as 2,2,4-trimethyl-1,2-dihydroquinoline polymer, a condensate of acetone and diphenylamine or a condensate of acetone and N-phenyl-2-naphthylamine), phenol anti-aging agents (for example, monophenols such as 2,6-di-t-butyl-4-methylphenol, bisphenols such as 2,2'-methylenebis(4-methyl-6-t-butylphenol)), and combinations of those.

The proportion of the anti-aging agent may be, for example, 30 parts by weight or less, preferably from 0.1 parts by weight to 20 parts by weight, and more preferably from 0.5 parts by weight to 15 parts by weight (for example, from 1 part by weight to 10 parts by weight), per 100 parts by weight of the rubber.

Examples of the lubricant include higher saturated fatty acid and its salt (for example, stearic acid or metal stearate), wax, paraffin and combinations of those. The proportion of the lubricant may be, for example, 30 parts by weight or less, preferably from 0.1 parts by weight to 20 parts by weight, and more preferably from 0.5 parts by weight to 15 parts by weight (for example, from 1 part by weight to 10 parts by weight), per 100 parts by weight of the rubber.

Examples of the solvent include hydrocarbons (for example, aromatic hydrocarbons such as toluene and xylene), halogenated hydrocarbons (for example, haloalkanes such as methylene chloride and chloroform), alcohols (for example, alkanols such as ethanol, propanol and isopropanol), ethers (for example, cyclic ethers such as dioxane and tetrahydrofuran), esters (for example, ethyl acetate), ketones (for example, chain ketones such as acetone and methyl ethyl ketone, and cyclic ketones such as cyclohexanone), cellosolves and carbitols. The solvent may be used alone or as mixtures of two or more thereof.

The proportion of the solvent may be, for example, from 0.5 parts by weight to 50 parts by weight, and preferably from 1 part by weight to 20 parts by weight, per 100 parts by weight of the rubber.

Representative example of the third treating agent includes a rubber cement obtained by dissolving a composition containing a rubber, an RF condensate and additives (for example, a vulcanizing agent, a covulcanizer, a vulcanization accelerator, an adhesion improver, a filler, an anti-aging agent and a lubricant) in a solvent. The rubber cement may has a rubber concentration which is not particularly limited, and may be, for example, from 1 wt % to 15 wt %, and preferably from 2 wt % to 10 wt %.

In the resultant obtained by treating the original yarn of the aramid core wire with the first treating agent, the second treating agent if necessary, and the third treating agent, the proportion (content or deposit ratio) of the third treating agent may be, for example, from 1 part by weight to 20 parts by weight, and preferably from 5 parts by weight to 15 parts by weight, per 100 parts by weight of the total of the first treating agent, the second treating agent if necessary, the third treating agent, and the original yarn of the aramid core wire. When the proportion of the third treating agent is too small, adhesive force between the rubber layer and the aramid core wire in a transmission belt is decreased. On the other hand, when the proportion of the third treating agent is too large, the thickness of a coating film formed by the third treating agent is increased, the coating film is easy to break, and adhesive force is easy to be decreased.

Average thickness of the coating film formed by the third treating agent is not particularly limited, and may be, for example, from 1 μm to 20 μm, and preferably from 5 μm to 15 μm.

Aramid Core Wire

The aramid core wire of the present invention can satisfy both of fray resistance and bending fatigue resistance, and is therefore suitable for use in a transmission belt. The aramid core wire is generally used by embedding in a rubber layer (for example, a rubber layer containing an olefin rubber such as ethylene-α-olefin elastomer) of the transmission belt.

The aramid core wire for a transmission belt may be an aramid core wire obtained by the production method described above. Specifically, the aramid core wire for a transmission belt is an aramid multifilament yarn (for example, a twisted yarn) having been covered or impregnated with the first treating agent containing an RF condensate, latex and a water-soluble epoxy compound, and if necessary, the second treating agent containing an RF condensate and a latex and/or the third treating agent containing a rubber (for example, an olefin rubber such as ethylene-α-olefin elastomer).

The aramid core wire preferably has an average diameter of, for example from 0.3 mm to 3 mm, preferably from 0.5 mm to 2.5 mm, and more preferably from 0.6 mm to 2 mm.

Transmission Belt

The transmission belt of the present invention contains the above-described aramid core wire, and in many cases, is generally a transmission belt equipped with a rubber layer having embedded therein a plurality of the aramid core wires in a longitudinal direction (or a circumferential direction) of the belt. Pitch (spinning pitch) between the adjacent core wires may be, for example, from 0.5 mm to 3 mm, preferably from 0.6 mm to 1.5 mm, and more preferably from 0.7 mm to 1.3 mm.

FIG. 1 is a schematic cross-sectional view showing a V-ribbed belt that is one example of the transmission belt of the present invention. The transmission belt of this example comprises an aramid core wire 1, an adhesive rubber layer 2 having embedded therein the aramid core wire 1 in a longitudinal direction of the belt, a compression rubber layer 3 formed on one surface (inner periphery) of the adhesive rubber layer, and an extensible rubber layer 4 formed on the other surface (outer periphery or back surface) of the adhesive rubber layer, wherein a V-shaped groove is formed by cutting on the compression rubber layer 3 to form a rib 5. The compression rubber layer 3 contains a polyamide short fiber 6 in order to improve lateral pressure resistance of the transmission belt. In many cases, the adhesive rubber layer 2, the compression rubber layer 3 and the extensible rubber layer 4 each are formed by a rubber composition containing the same components as the components contained in the third treating agent (that is, a rubber composition containing an olefin rubber such as ethylene-α-olefin elastomer). Further, on the back surface of the extensible rubber layer 4, a reinforcing cloth formed by a woven fabric, a non-woven cloth or a knitted fabric may be laminated.

Figure 2:
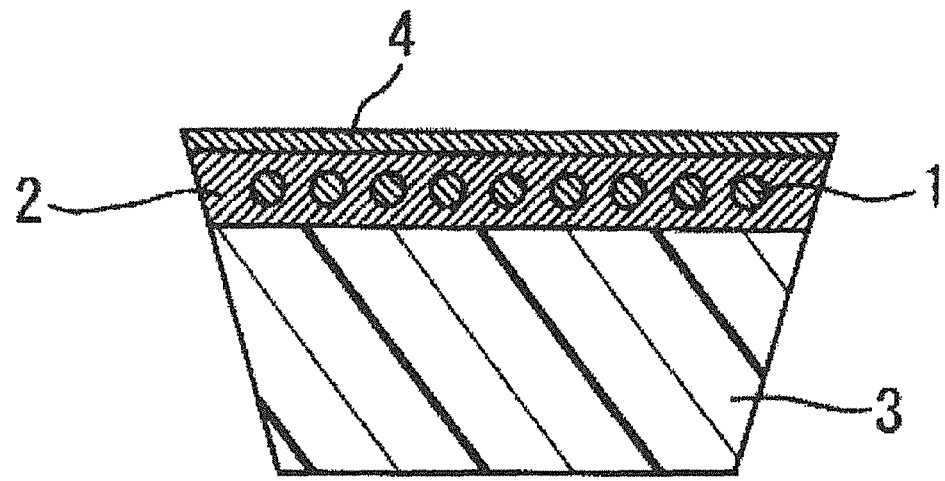
FIG. 2 is a schematic cross-sectional view showing another example of the transmission belt of the present invention.

FIG. 2 is a schematic cross-sectional view showing a raw edge V belt that is another example of the transmission belt of the present invention. The belt shown in FIG. 2 has the same constitution as in FIG. 1, except that the rib 5 is not formed on the compression rubber layer 3 and the shape is a trapezoidal shape that a belt width is decreased toward an inner periphery from an outer periphery. A plurality of cog parts (convex portions) may be formed on the compression rubber layer 3 at constant intervals in a longitudinal direction of the belt. Further, on the surface (inner periphery) of the compression rubber layer 3 and the surface (outer periphery) of the extensible rubber layer 4, a reinforcing cloth formed by a woven fabric, a non-woven cloth or a knitted fabric may be laminated.

The transmission belt is not limited to the V-ribbed belt and raw edge V belt described above, and can be used in a toothed belt, a flat belt and the like.

Production Method of Transmission Belt

The transmission belt of the present invention can be produced by vulcanizing a cylindrical laminate having an aramid core wire treated with a specific treating agent sandwiched between a pair of unvulcanized rubber sheets (including unvulcanized laminate rubber sheets) to prepare a cylindrical transmission belt precursor (vulcanized belt sleeve), and cutting the cylindrical transmission belt precursor in a circumferential direction. Thus, even though the cylindrical transmission belt precursor is cut in such a manner, scuffing and fray of the aramid core wire are not generated on a side surface of the transmission belt. In many cases, the unvulcanized rubber sheets may be the same or different from each other and may be formed of a rubber composition containing components as exemplified in the third treating agent (for example, an olefin rubber such as ethylene-α-olefin elastomer).

More specifically, the transmission belt of the present invention can be formed as follows. A sheet for a compression rubber layer and a sheet for a first adhesive rubber layer are sequentially wound around a cylindrical molding drum, the aramid core wire of the present invention is spirally spun thereon, and subsequently a sheet for a second adhesive rubber layer and a sheet for an extensible rubber layer are sequentially wound thereon, thereby forming a laminate. The laminate is vulcanized to prepare a vulcanized belt sleeve, and the cylindrical vulcanized belt sleeve is cut in a circumferential direction. In cutting, the aramid core wire arranged or oriented in a circumferential direction is cut, and the aramid core wire is exposed on a side surface (cut surface) of the transmission belt. When the aramid core wire is exposed on the side surface of the transmission belt, there is the possibility that an aramid yarn easy to ravel out, pop-out occurs that the aramid core wire projects from the side surface of the transmission belt starting from an aramid yarn raveled out of the side surface of the transmission belt, the aramid core wire popped out winds around a shaft of a pulley that rotates, and the transmission belt breaks. However, in the transmission belts shown in FIGS. 1 and 2, the aramid core wire treated with the specific treating agent is embedded in the adhesive rubber layer, and binding property among filaments of the aramid core wire is high. Therefore, the aramid core wire does not ravel out on the side surface of the transmission belt, pop out of the aramid core wire can effectively be prevented, and durability of the transmission belt can remarkably be improved.

EXAMPLES

The present invention is described in detail below by reference to examples, but the invention is not construed as being limited to those examples.

(1) Raw Materials (1-1) Rubber

EPDM: IP3640, manufactured by Du Pont Dow Elastomers Japan, Mooney viscosity: 40 (100° C.)

(1-2) Epoxy Compound

DENACOL EX313 (manufactured by Nagase Chemtex Corporation, glycerol polyglycidyl ether, bi- or trifunctional, epoxy equivalent: 141, water solubility: 99%)

DENACOL EX941 (manufactured by Nagase Chemtex Corporation, polypropylene glycol diglycidyl ether, bifunctional, the number of oxypropylene groups (average addition mole number): 2, epoxy equivalent: 173, water solubility: 89%)

DENACOL EX614B (manufactured by Nagase Chemtex Corporation, sorbitol polyglycidyl ether, tetra or more polyfunctional, epoxy equivalent: 173, water solubility: 94%)

DENACOL EX521 (manufactured by Nagase Chemtex Corporation, polyglycerol polyglycidyl ether, trifunctional, epoxy equivalent: 183, water solubility: 100%)

DENACOL EX830 (manufactured by Nagase Chemtex Corporation, polyethylene glycol diglycidyl ether, bifunctional, the number of oxyethylene groups (average addition mole number): 9, epoxy equivalent: 268, water solubility: 100%)

DENACOL EX212 (manufactured by Nagase Chemtex Corporation, 1,6-hexanediol diglycidyl ether, bifunctional, epoxy equivalent: 151, water solubility: 0%)

(1-3) RF Condensate

Resorcin-formaldehyde copolymer (resorcinol resin): resorcin-formaldehyde copolymer containing less than 20% of resorcinol and less than 0.1% of formaldehyde (1-4) Additives Organic peroxide: PERKADOX 14PR, manufactured by Kayaku Akzo Corporation Vulcanization accelerator MBTS: 2-mercaptothiazoline, dibenzothiazyl disulfide Vulcanization accelerator DM: di-2-benzothiazolyl disulfide, aqueous silica: NIPSIL VN3, manufactured by Tosoh Silica Corporation, specific surface area: 240 m$^2$/g Carbon HAF: SEAST 3 manufactured by Tokai Carbon Co., Ltd.

Anti-aging agent: NONFLEX OD3 manufactured by Seiko Chemical Corporation

Paraffin softener: DIANA PROCESS OIL manufactured by Idemitsu Kosan Co., Ltd.

Polyamide short fiber: 66 NYLON manufactured by Asahi Kasei Corporation (2) Fray Test To evaluate fray property of an aramid core wire, a V-ribbed belt was prepared in the following method. One ply of a rubber-attached cotton canvas was wound around an outer periphery of a cylindrical mold having smooth surface, and a sheet for an unvulcanized adhesive rubber layer, formed by the rubber composition shown in Table 1 was wound on the outside of the cotton canvas. An aramid core wire was wound by spinning over the sheet for an unvulcanized adhesive rubber layer. Further, another sheet for an unvulcanized adhesive rubber sheet, formed by the rubber composition shown in Table 1 and a sheet for an unvulcanized compression rubber layer, formed by the rubber composition shown in Table 2 were wound thereon in this order. The mold was placed in a vulcanizer in a state that a jacket for vulcanization was arranged on the outside of the sheet for an unvulcanized compression rubber layer, and vulcanization was conducted. A cylindrical vulcanized rubber sleeve obtained by the vulcanization was taken out of the mold, and the compression rubber layer of the vulcanized rubber sleeve was ground by a grinder to simultaneously form a plurality of V-shaped grooves. The vulcanized rubber sleeve was then cut by a cutter in a circumferential direction so as to slice in rounds, thereby obtaining a V-ribbed belt having three ribs formed thereon.

Regarding the V-ribbed belt prepared above, the state of fray of the aramid core wire on a side surface of a belt cut by a cutter in a circumferential direction was evaluated on the basis of the following standards. The case that the evaluation was "Good" or more was evaluated as good.

Excellent: Fray is not observed on an edge face after cutting into a belt, and even thought the edge face is rubbed and the belt is run, fray is not generated.

Good: Fray is not observed on an edge face after cutting into a belt, and even thought the edge face is rubbed and the belt is run, fray is not almost generated.

Fair: Fray is not observed on an edge face after cutting into a belt, but when the edge face is rubbed or the belt is run, fray is generated.

Poor: Fray is observed on an edge face after cutting into a belt.

In the above evaluation, the fray state after rubbing was evaluated in the following manner. A cut surface of a V-ribbed belt is moved along one direction in a range of 10 cm in a length direction while pressing an iron-made metal plate. This operation is repeated 10 times, and a core wire exposed on the cut surface of the belt is observed.

Figure 4:
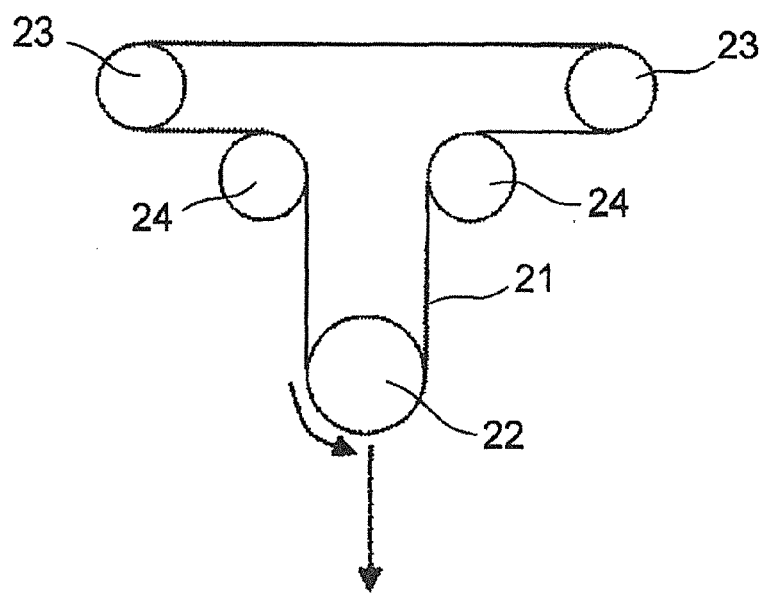
FIG. 4 is a schematic view showing a testing machine for evaluating fray after running the transmission belt of the examples.

The fray state after running a belt was evaluated in the following manner. As shown in FIG. 4, a V-ribbed belt 21 is wound around a drive pulley 22 (diameter: 60 mm), two tension pulleys 23 (diameter: 50 mm) and two idler pulleys 24 (diameter: 50 mm), a load of 400 N/3 ribs is applied to the drive pulley 22, the drive pulley 22 is rotated at a rotation rate of 3,300 rpm and run for 100 hours in an atmosphere of 130° C., and thereafter a core wire exposed on the cut surface of the belt is observed.

TABLE 1

| Adhesive rubber layer | Parts by weight |
|---|---|
| EPDM | 100 |
| Stearic acid | 1 |
| Zinc oxide | 5 |
| Carbon HAF | 35 |
| Aqueous silica | 20 |
| Resorcin-formaldehyde copolymer | 2 |
| Anti-aging agent | 2 |
| Vulcanization accelerator DM | 2 |
| Hexamethoxymethylol melamine | 2 |
| Sulfur | 1 |
| Total | 170 |

TABLE 2

| Compression rubber layer | Parts by weight |
|---|---|
| EPDN | 100 |
| Polyamide short fiber | 15 |
| Cotton short fiber | 25 |
| Zinc oxide | 5 |
| Stearic acid | 1 |
| Mercaptobenzimidazole | 1 |
| Carbon HAF | 60 |
| Paraffin softener | 10 |
| Organic peroxide | 4 |
| Dibenzoyl-quinone dioxime | 2 |
| Total | 223 |

(3) Peel Test

Figure 3A:
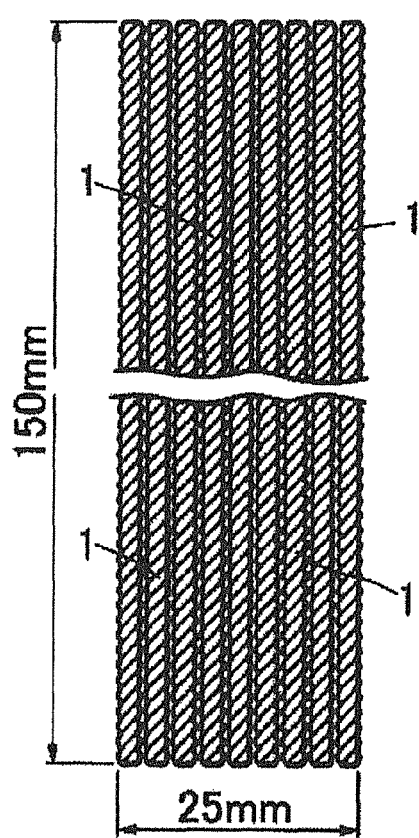
FIG. 3($a$) is a schematic view showing an arrangement of core wires in a test specimen in a peel test of the examples, and FIG. 3($b$) is a schematic view showing a testing machine used in a bending fatigue test of the examples.

On one surface of an unvulcanized rubber sheet (thickness: 4 mm) having the composition shown in Table 1, a plurality of aramid core wires each having a length of 150 mm were arranged in parallel so as to have a width of 25 mm as shown in FIG. 3(a), and a canvas was laminated on the other surface of the unvulcanized rubber sheet. Pressure of 0.2 MPa (2 kgf/cm$^2$) was applied to the resulting laminate by a press plate to press the laminate, and the laminate was further heated at 160° C. for 30 minutes to vulcanize. Thus, a strip test specimen (width: 25 mm, length: 150 mm, thickness: 4 mm) for a peel test was prepared. Using the test specimen, peel test was conducted in a tensile rate of 50 mm/min in accordance with JIS K6256-1 (2006), and adhesive force (adhesive force after vulcanization) between the aramid core wire and the rubber was measured in an atmosphere of room temperature. The case where adhesive force is 500 N or more was evaluated as "Excellent", the case where adhesive force is from 400 N to less than 500 N was evaluated as "Good", the case where adhesive force is from 250 N to less than 400 N was evaluated as "Fair", and the case where adhesive force is less than 250 N was evaluated as "Poor". When the evaluation is "Good" or more, adhesive property was judged as being good.

(4) Bending Fatigue Test

A test specimen for a bending fatigue test was prepared as follows. An unvulcanized rubber sheet (thickness: 0.5 mm) having the composition shown in Table 1 was wound around a cylindrical mold, an aramid core wire was spirally wound thereon, and another unvulcanized rubber sheet (thickness: 0.5 mm) having the composition shown in Table 1 was further wound thereon. The rubber sheets were covered with a jacket, followed by heating to vulcanize. Thus, a vulcanized rubber sleeve was prepared. The vulcanized rubber sleeve was cut in a circumferential direction by a cutter to prepare a test specimen 11 such that two aramid core wires were embedded therein and the aramid core wire did not expose on the cut side surface. The test specimen 11 had a width of 3 mm, a length of 50 cm and a thickness of 1.5 mm.

Figure 3B:
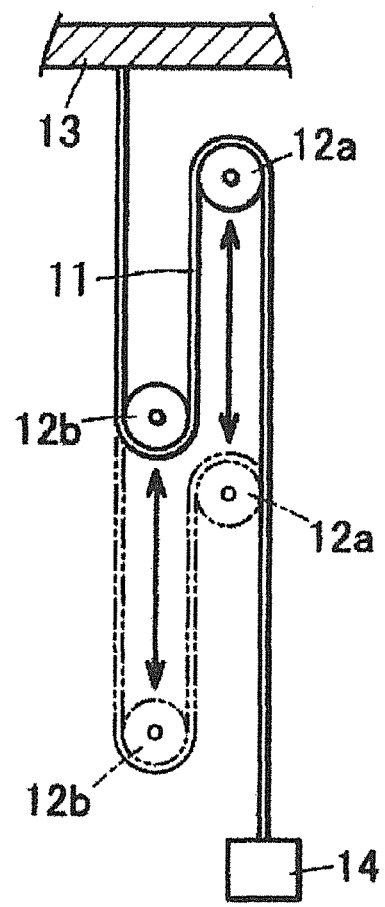

Bending fatigue test was conducted as follows. As shown in FIG. 3(b), the test specimen 11 prepared as above was wound and hung in a curved shape on a pair of columnar revolving bars (diameter: 30 mm) 12a and 12b arranged up and down. One end of the test specimen 11 was fixed to a frame 13, and a load 14 of 2 kg was applied to the other end of the test specimen 11. While keeping a relative distance of the pair of revolving bars 12a and 12b constant, the pair of revolving bars 12a and 12b were vertically reciprocated 300,000 times (stroke: 100 mm, cycle: 100 times/min). Thus, winding and rewinding of the test specimen 11 to the revolving bars 12a and 12b were repeated, and were subjected to bending fatigue. Using autograph AGS-J10kN manufactured by Shimadzu Corporation, the test specimen after bending was pulled in a tensile rate of 50 mm/min, and strength at break of the test specimen was measured. On the other hand, strength at break of the test specimen before bending was previously measured, and strength retention was calculated based on the following formula.

Strength retention(%)=(strength after bending/strength before bending)×100

(5) Stability of Treating Liquid

Stability of a treating liquid was evaluated by the amount of insoluble matter precipitated. The case where precipitates are not formed even after a lapse of 72 hours was evaluated as "Good".

Examples 1 to 11 and Comparative Examples 1 to 8

Preparation of Aramid Fiber Cord

One bundle (the bundle is referred to as an "aramid fiber single yarn") of non-twisted aramid fiber filaments arranged in a ribbon shape, consisting of aramid fibers (TECHNORA, manufactured by Teijin Limited) of 1670 dtex (the number of filaments: 1,000) was first-twisted (Z twisted) in the number of first-twist of 3.7 times/10 cm. Two first-twisted yarns thus obtained were bundled, and the bundle was second-twisted (Z twisted) in the number of second-twist of 13.1 times/10 cm in the same direction as in the first-twist. Thus an aramid fiber cord was prepared.

Preparation of First Treating Liquid and Second Treating Liquid

A given amount of a water-soluble epoxy compound was mixed with an RFL liquid having the composition shown in Table 3, followed by stirring at room temperature for 10 minutes. Then, the first treating liquid and second treating liquid (RFL 1 to 16) having the compositions shown in Tables 4 and 5 were prepared.

TABLE 3

| RFL liquid formulation | Parts by weight | Solid content (parts by weight) |
|---|---|---|
| Resorcin | 110 | 110 |
| Formaldehyde | 162 | 59.94 |
| Sodium hydroxide | 3 | 3 |
| Water | 780.5 | — |
| NBR latex | 250 | 100 |
| Water | 59.2 | — |
| Total | 1364.7 | 272.94 |
| RFL solid content concentration (wt %) | | 20 |

TABLE 4

|  | RFL 1 | RFL 2 | RFL 3 | RFL 4 | RFL 5 | RFL 6 | RFL 7 | RFL 8 |
|---|---|---|---|---|---|---|---|---|
| RFL liquid (parts by weight) | 100 | 100 | 100 | 100 | 100 | 100 | 100 | 100 |
| Water (parts by weight) | 4.21 | 14.12 | 26.67 | 14.12 | 14.12 | 14.12 | 14.12 | 300 |
| DENACOL EX313 (parts by weight) | 1.05 | 3.53 | 6.67 | — | — | — | — | — |

TABLE 4-continued

| | RFL 1 | RFL 2 | RFL 3 | RFL 4 | RFL 5 | RFL 6 | RFL 7 | RFL 8 |
|---|---|---|---|---|---|---|---|---|
| DENACOL EX941 (parts by weight) | — | — | — | 3.53 | — | — | — | — |
| DENACOL EX614B (parts by weight) | — | — | — | — | 3.53 | — | — | — |
| DENACOL EX521 (parts by weight) | — | — | — | — | — | 3.53 | — | — |
| DENACOL EX830 (parts by weight) | — | — | — | — | — | — | 3.53 | — |
| DENACOL EX212 (parts by weight) | — | — | — | — | — | — | — | — |
| Epoxy compound solid content concentration (wt %) | 5 | 15 | 25 | 15 | 15 | 15 | 15 | 0 |
| Total solid content concentration (wt %) | 20 | 20 | 20 | 20 | 20 | 20 | 20 | 5 |
| Total (parts by weight) | 105.3 | 117.6 | 133.3 | 117.6 | 117.6 | 117.6 | 117.6 | 400 |

TABLE 5

| | RFL 9 | RFL 10 | RFL 11 | RFL 12 | RFL 13 | RFL 14 | RFL 15 | RFL 16 |
|---|---|---|---|---|---|---|---|---|
| RFL liquid (parts by weight) | 100 | 100 | 100 | 100 | 100 | 100 | 100 | 100 |
| Water (parts by weight) | 900 | 100 | 1900 | 81.82 | 14.12 | 0 | 426.67 | 367.06 |
| DENACOL EX313 (parts by weight) | — | — | — | — | — | — | 6.67 | 3.53 |
| DENACOL EX941 (parts by weight) | — | — | — | — | — | — | — | — |
| DENACOL EX614B (parts by weight) | — | — | — | — | — | — | — | — |
| DENACOL EX521 (parts by weight) | — | — | — | — | — | — | — | — |
| DENACOL EX830 (parts by weight) | — | — | — | — | — | — | — | — |
| DENACOL EX212 (parts by weight) | — | — | — | — | 3.53 | — | — | — |
| Epoxy compound solid content concentration (wt %) | 0 | 0 | 0 | 0 | 15 | 0 | 25 | 15 |
| Total solid content concentration (wt %) | 2 | 10 | 1 | 11 | 20 | 20 | 5 | 5 |
| Total (parts by weight) | 1000 | 200 | 2000 | 181.8 | 117.6 | 100 | 533.3 | 470.6 |

RFL Treatment of Aramid Fiber Cord

An aramid fiber cord was dipped in a first treating liquid, followed by drying treatment. The dipping was conducted by passing the aramid fiber cord through the first treating liquid for 3 seconds, and the drying was conducted under the conditions of 230° C. for 1.5 minutes. In Example 2, adhesion ratio of the first treating liquid ((weight after treatment−weight before treatment)/weight after treatment×100) was 9 wt %. The respective first treating liquids used in each Example and Comparative Example are shown in Tables 8 to 10.

The aramid fiber cord treated with the first treating liquid was dipped in a second treating liquid, followed by drying treatment. Dipping conditions and drying conditions are the same as in the case of the first treating liquid. The respective second treating liquids used in each Example and Comparative Example are shown in Tables 8 to 10.

Rubber Cement Treatment of Aramid Fiber Cord

The aramid fiber cord treated with the second treating liquid was dipped in a rubber cement, followed by drying treatment. Thus, an aramid core wire (RFL solid content adhesion ratio: 10 wt %) was obtained. As the rubber cement, a solution (solution having the composition shown in Table 7) obtained by dissolving an EPDM-blended rubber composition shown in Table 6 in toluene and adding polymeric isocyanate thereto was used. The dipping was conducted by passing the aramid fiber cord through the rubber cement for 3 seconds, and the drying was conducted under conditions of 170° C. for 1.5 minutes.

TABLE 6

| EPDM-blended rubber composition | Parts by weight |
|---|---|
| EPDM | 100 |
| Stearic acid | 5 |
| Zinc oxide | 5 |
| Carbon black HAF | 10 |
| Aqueous silica | 15 |
| Resorcin-formaldehyde copolymer | 2 |
| Anti-aging agent | 2 |
| Vulcanization accelerator MBTS | 2 |
| Hexamethoxymethylol melamine | 2 |
| Sulfur | 1 |
| Total | 144 |

TABLE 7

| Solution formulation | Parts by weight |
|---|---|
| EPDM-blended rubber composition | 93 |
| Polymeric isocyanate | 7 |
| Toluene | 900 |
| Total | 1000 |

Regarding the aramid core wires obtained in Examples 1 to 12 and Comparative Examples 1 to 5, fray resistance, peel test (adhesive force test), bending fatigue test, and stability of a treating liquid were evaluated. The results obtained are shown in Tables 8 to 10. Fray state of the aramid core wires obtained in Examples 1 and 2 and Comparative Example 1 is shown in FIG. 5.

TABLE 8

|  | Example 1 | Example 2 | Example 3 | Example 4 | Example 5 | Example 6 | Example 7 |
|---|---|---|---|---|---|---|---|
| First treating liquid | RFL 1 | RFL 2 | RFL 3 | RFL 3 | RFL 1 | FRL 3 | RFL 1 |
| Latex | NBR | NBR | NBR | NBR | NBR | NBR | NBR |
| Solid content concentration of epoxy compound (wt %) | 5 | 15 | 25 | 25 | 5 | 25 | 5 |
| Epoxy compound | DENACOL EX313 | DENACOL EX313 | DENACOL EX313 | DENACOL EX313 | DENACOL EX313 | DENACOL EX313 | DENACOL EX313 |
| Water solubility of epoxy compound (%) | 99 | 99 | 99 | 99 | 99 | 99 | 99 |
| Epoxy equivalent | 141 | 141 | 141 | 141 | 141 | 141 | 141 |
| Treating liquid concentration (wt %) | 20 | 20 | 20 | 20 | 20 | 20 | 20 |
| Second treating liquid | RFL 8 | RFL 8 | RFL 8 | RFL 15 | RFL 9 | RFL 10 | RFL 11 |
| Latex | NBR | NBR | NBR | NBR | NBR | NBR | NBR |
| Solid content concentration of epoxy compound (wt %) | 0 | 0 | 0 | 25 | 0 | 0 | 0 |
| Epoxy compound | — | — | — | DENACOL EX313 | — | — | — |
| Water solubility of epoxy compound (%) | — | — | — | 99 | — | — | — |
| Epoxy equivalent | — | — | — | 141 | — | — | — |
| Treating liquid concentration (wt %) | 5 | 5 | 5 | 5 | 2 | 10 | 1 |
| Fray state | Good | Excellent | Good | Good | Good | Good | Good |
| Adhesive force to rubber | 410 | 510 | 420 | 480 | 350 | 420 | 320 |
| Strength retention (%) | 78 | 78 | 78 | 70 | 78 | 78 | 78 |
| Stability of treating agent | Good | Good | Good | Good | Good | Good | Good |

TABLE 9

|  | Example 8 | Example 9 | Example 10 | Example 11 | Example 12 |
|---|---|---|---|---|---|
| First treating liquid | RFL 3 | RFL 4 | RFL 5 | RFL 6 | RFL 7 |
| Latex | NBR | NBR | NBR | NBR | NBR |
| Solid content concentration of epoxy compound (wt %) | 25 | 15 | 15 | 15 | 15 |
| Epoxy compound | DENACOL EX313 | DENACOL EX941 | DENACOL EX614B | DENACOL EX521 | DENACOL EX830 |
| Water solubility of epoxy compound (%) | 99 | 89 | 94 | 100 | 100 |
| Epoxy equivalent | 141 | 173 | 173 | 183 | 268 |
| Treating liquid concentration (wt %) | 20 | 20 | 20 | 20 | 20 |
| Seconding liquid | RFL 12 | RFL 8 | RFL 8 | RFL 8 | RFL 8 |
| Latex | — | — | — | — | — |
| Solid content concentration of epoxy compound (wt %) | 0 | 0 | 0 | 0 | 0 |
| Epoxy compound | — | — | — | — | — |
| Water solubility of epoxy compound (%) | — | — | — | — | — |
| Epoxy equivalent | — | — | — | — | — |
| Treating liquid concentration (wt %) | 11 | 5 | 5 | 5 | 5 |
| Fray state | Good | Good | Good | Good | Good |
| Adhesive force to rubber | 350 | 320 | 430 | 425 | 410 |
| Strength retention (%) | 78 | 75 | 75 | 75 | 59 |
| Stability of treating agent | Good | — | — | Good | Good |

TABLE 10

|  | Comp. Ex. 1 | Comp. Ex. 2 | Comp. Ex. 3 | Comp. Ex. 4 | Comp. Ex. 5 |
|---|---|---|---|---|---|
| First treating liquid | Bisphenol A epoxy | Isocyanate | RFL 13 | RFL 14 | RFL 14 |
| Latex | — | — | NBR | NBR | NBR |
| Solid content concentration of epoxy compound (wt %) | — | — | 15 | 0 | 0 |
| Epoxy compound | — | — | DENACOL EX212 | — | — |
| Water solubility of epoxy compound (%) | — | — | 0 | — | — |

TABLE 10-continued

|  | Comp. Ex. 1 | Comp. Ex. 2 | Comp. Ex. 3 | Comp. Ex. 4 | Comp. Ex. 5 |
|---|---|---|---|---|---|
| Epoxy equivalent | — | — | 151 | — | — |
| Treating liquid concentration (wt %) | 10 | 10 | 20 | 20 | 20 |
| Seconding liquid | RFL 10 | RFL 10 | RFL 8 | RFL 8 | RFL 16 |
| Latex | — | — | — | — | NBR |
| Solid content concentration of epoxy compound (wt %) | 0 | 0 | 0 | 0 | 15 |
| Epoxy compound | — | — | — | — | DENACOL EX313 |
| Water solubility of epoxy compound (%) | — | — | — | — | 99 |
| Epoxy equivalent | — | — | — | — | 141 |
| Treating liquid concentration (wt %) | 10 | 10 | 5 | 5 | 5 |
| Fray state | Poor | Poor | Poor | Poor | Poor |
| Adhesive force to rubber | 240 | 235 | 280 | 300 | 305 |
| Strength retention (%) | 19 | 30 | 68 | 70 | 71 |
| Stability of treating agent | Good | Good | Large amount of precipitates of insoluble matter | Good | Good |

In Tables 8 to 10, the solid content concentration of the epoxy compound and the treating liquid concentration were calculated based on the following equations.

Solid content concentration of epoxy compound(wt %)=Amount(parts by weight) of epoxy compound/[amount(parts by weight) of epoxy compound+solid content amount(parts by weight) of RFL liquid]×100

Treating liquid concentration(wt %)=[Amount(parts by weight) of epoxy compound+solid content amount(parts by weight) of RFL liquid]/amount (parts by weight) of treating liquid×100

As is apparent from Tables 8 to 10, in the Examples, fray can be prevented, and additionally, strength retention is high and bending fatigue resistance is excellent, as compared with the Comparative Examples. Furthermore, in the Examples, adhesive property to a rubber is excellent.

INDUSTRIAL APPLICABILITY

The aramid core wire of the present invention can satisfy both of fray resistance and bending fatigue resistance, and is therefore suitable for use in a transmission belt (for example, a friction transmission belt such as a flat belt, a V belt or a V-ribbed belt, a toothed belt such as a timing belt or a double side synchronous belt, and a synchronous power transmission belt such as cogged belt). Furthermore, the aramid core wire of the present invention has high modulus in addition to the above characteristics, and therefore can also be preferably used in high load transmission device members such as printing machine, automatic vending machine, working machine and automotive engine.

While the present invention has been described in detail with reference to the specific embodiments thereof, it will be apparent to one skilled in the art that various changes and modifications can be made therein without departing from the spirit and scope of the present invention.

The present application is based on the Japanese Patent Application No. 2012-36225 filed on Feb. 22, 2012, and the entire contents thereof are incorporated herein by reference. All references cited herein are incorporated in their entirety.

What is claimed is:

1. An aramid core wire produced by a method comprising:
a step of covering or impregnating an original yarn of an aramid core with a first treating agent containing a condensate of resorcin and formaldehyde, a latex and a water-soluble epoxy compound; and
a step of covering or impregnating the original yarn covered or impregnated with the first treating agent, with a second treating agent containing a condensate of resorcin, formaldehyde and a latex;
wherein the first treating agent is attached to the original yarn in an amount of from 1 part by weight to 20 parts by weight in terms of a solid content per 100 parts by weight of the total of the first treating agent and the original yarn,
wherein the second treating agent is attached to the original yarn treated with the first treating agent in an amount of from 0.1 parts by weight to 2 parts by weight in terms of a solid content per 100 parts by weight of the total of the first treating agent, the second treating agent and the original yarn, and
wherein the second treating agent is a water-soluble epoxy-compound-free.

2. A transmission belt comprising an adhesive rubber layer having the aramid core wire described in claim 1 embedded therein in a longitudinal direction of the belt, and a compression rubber layer formed on one surface of the adhesive rubber layer.

3. The transmission belt according to claim 2, wherein the adhesive rubber layer and the compression rubber layer each contain an olefin rubber.

4. The aramid core wire according to claim 1, wherein the water-soluble epoxy compound is at least one compound selected from the group consisting of alkane polyol polyglycidyl ethers and polyalkane polyol polyglycidyl ethers.

5. The aramid core wire according to claim 1, wherein the water-soluble epoxy compound has an epoxy equivalent of 200 g/eq or less.

6. The aramid core wire according to claim 1, wherein the water-soluble epoxy compound has a dissolution rate to water at 25° C. of 90% or more.

7. The aramid core wire according to claim 1, wherein the original yarn of an aramid core is a twisted yarn.

8. The aramid core wire according to claim 1, wherein the first treating agent has a solid concentration of the epoxy compound calculated by dividing a weight of a solid content of the water-soluble epoxy compound by a total weight of a weight of a solid content of the condensate of resorcin and formaldehyde, a weight of a solid content of the latex and the weight of a solid content of the water-soluble epoxy compound, of from 5 wt % to 25 wt %.

9. The aramid core wire according to claim 1, wherein the first treating agent has a total solid concentration of from 5 wt % to 35 wt %.

10. The aramid core wire according to claim 1, wherein the method further comprises a step of covering or impregnating the original yarn of an aramid core wire covered or impregnated with the first treating agent, with a third treating agent containing an olefin rubber.

11. The aramid core wire according to claim 1, wherein the method further comprises a step of covering or impregnating the original yarn of an aramid core wire covered or impregnated with the first treating agent and the second treating agent, with a third treating agent containing an olefin rubber.

12. A transmission belt produced by a method comprising vulcanizing a cylindrical laminate having the aramid core wire described in claim 1 sandwiched between a pair of unvulcanized rubber sheets to form a cylindrical vulcanized belt sleeve, and cutting the cylindrical vulcanized belt sleeve in a circumferential direction thereof.

\* \* \* \* \*